United States Patent [19]

Nakanishi

[11] 4,101,181
[45] Jul. 18, 1978

[54] BEARING STRUCTURE FOR A ROTARY DISC

[75] Inventor: Keiichi Nakanishi, Yokohama, Japan

[73] Assignee: Nissan Motor Company, Limited, Japan

[21] Appl. No.: 756,602

[22] Filed: Jan. 4, 1977

[30] Foreign Application Priority Data

Jan. 8, 1976 [JP] Japan .................................... 51-1040
Mar. 12, 1976 [JP] Japan .................................. 51-29456

[51] Int. Cl.$^2$ ............................................ F16C 13/02
[52] U.S. Cl. ...................................... 308/36; 308/19; 308/66; 308/DIG. 15
[58] Field of Search ...................... 308/21, 181, 36, 66, 308/18–20, 68

[56] References Cited

U.S. PATENT DOCUMENTS

| | | | |
|---|---|---|---|
| 1,971,547 | 8/1934 | White | 308/19 |
| 2,647,805 | 8/1953 | Kravs | 308/19 |
| 3,639,980 | 2/1972 | Muse et al. | 308/18 |

*Primary Examiner*—Richard A. Bertsch

[57] ABSTRACT

An improved bearing structure has a plurality of spaced first ring members coaxially mounted on a stationary shaft, each of the first ring members having at its each radial side first means defining a first conical wall surface, a plurality of spaced second ring members coaxially mounted on the peripheral surface of a central bore of the rotary disc while alternatively projecting, in a meshing manner, into spaces defined between the first ring members, each of the second ring members having at its each radial side second means defining a second conical wall surface which is contiguously engaged with the first conical wall surface and holding means for providing tight connection between the first and second ring members and the stationary shaft.

11 Claims, 5 Drawing Figures

FIG. 3
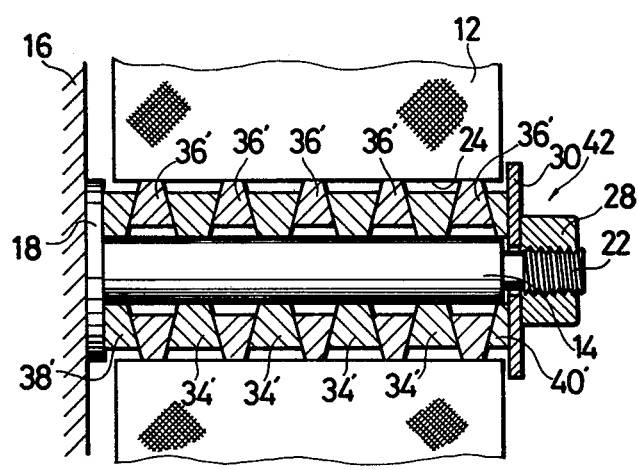
FIG. 4A          FIG. 4B
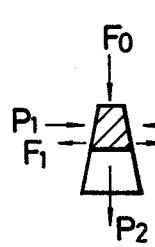     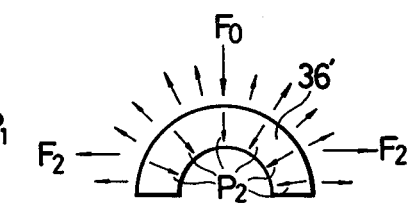

BEARING STRUCTURE FOR A ROTARY DISC

The present invention relates in general to a gas turbine engine and more particularly to a bearing structure for rotatably supporting a rotary-type heat regenerator of the engine on a stationary shaft.

It is an object of the present invention to provide an improved bearing structure which provides a smooth and reliable rotation of a rotary-type regenerator about a stationary shaft.

It is another object of the present invention to provide an improved bearing structure which is considerably strong in spite of employing some brittle or fragile materials therein.

It is still another object of the present invention to provide an improved bearing structure which is constructed to arrange wear-resisting members at positions engageable with an inner peripheral wall surface defining a central opening of the heat regenerator.

Other objects of the present invention will become more apparent from the following description when taken in conjunction with the accompanied drawings, in which:

FIG. 3 is a sectional view showing a second preferred embodiment of an improved bearing structure according to the present invention; and FIGS. 4A and 4B illustrate the principle of the second preferred embodiment of the present invention.

Prior to explaining the improved bearing structure of the present invention, a description of a prior art bearing structure will be given with the aid of FIG. 1 in order to clarify the inventive steps of the subject invention.

Figure 1:
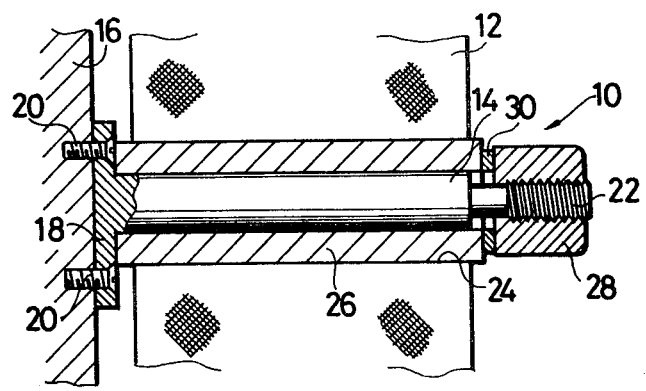
FIG. 1 is a sectional view showing a prior art bearing structure for the rotary type heat regenerator.

In FIG. 1, one of the conventional bearing structures 10 is shown as supporting a heat accumulator or rotary-type heat regenerator 12 on a shaft 14 fixed to a stationary base portion 16 such as a rigid member of a gas turbine engine (not shown). In this drawing, the shaft 14 has at its one end a flange 18 fixed through screw bolts 20 to the stationary base portion 16 and at the other end a threaded stud portion 22. The shaft 14 is disposed in a bore 24 formed in the central portion of the heat regenerator 12. Disposed in an annular space defined between the outer periphery of the shaft 14 and the periphery of the central bore 24 is a carbon sleeve 26 which has both axial ends slightly projecting from the axial end portions of the bore 24, as shown. A nut 28 and a spring washer 30 are connected or fixed to the threaded stud portion 22 for a tight connection between the shaft 14 and the carbon sleeve 26.

With this consturction, the sliding rotation of the heat regenerator 12 about the carbon sleeve 26 is made of a conventional manner.

However, in this conventional construction, there has occurred a problem in that the carbon sleeve 26 is subjected to high abrasion especially at the outer peripheral surface thereof, the surface being slidably engageable with the peripheral wall surface of the bore 24 of the heat regenerator 12, thus causing rattling rotation of the regenerator 12. This is because the carbon sleeve 26 does not have sufficient resistance to wear. Accordingly, in this conventional structure, troublesome, costly and frequent replacements of the carbon sleeve will be required.

Thus, as mentioned before, the present invention proposes to eliminate the above-mentioned drawbacks encountered in the conventional bearing structure employing such a carbon sleeve.

The inventor has found that a sinter comprising $CaF_2$ (calcium fluoride) and $NiO$ (nickel monoxide) has a very high resistance to wear and a considerable durability to compression stress. In these days however, it is very difficult to produce an article of the sinter having a sufficient size similar to that of the before-mentioned carbon sleeve. In view of the above, the inventor has prepared for the formation of the bearing structure a plurality of small ring members made of the $CaF_2$-$NiO$ sinter, which members are coaxially disposed about the shaft in the annular space defined between the shaft and the periphery of the bore of the heat regenerator. Unfortunately with this construction, some of the sinter ring members were broken during the rotational operation of the heat regenerator about the shaft. The breakage of the ring members was caused by slight impact shocks of the heat regenerator, during the rotation thereof, applied on the ring members causing a certain degree of tensile stress. In fact, the durability of the $CaF_2$-$NiO$ sinter to such tensile stress is poor. In addition, because a certain amount of gaps causing the breakage of the ring members appeared at the engaging sections of the outer periphery of the shaft and the inner peripheral wall surfaces of the central openings of the ring members, it was quite difficult to arrange the bearing structure concentrically with the shaft. Although it may be possible to provide such concentric connection between the bearing structure and the shaft by using a so-called shrinkage fit technic, there will arise a fear that the ring members may be broken by heat expansion difference between the ring members and the shaft when mounted on the shaft after being heated. Thus, such technic is impractical in this case.

Figure 2:
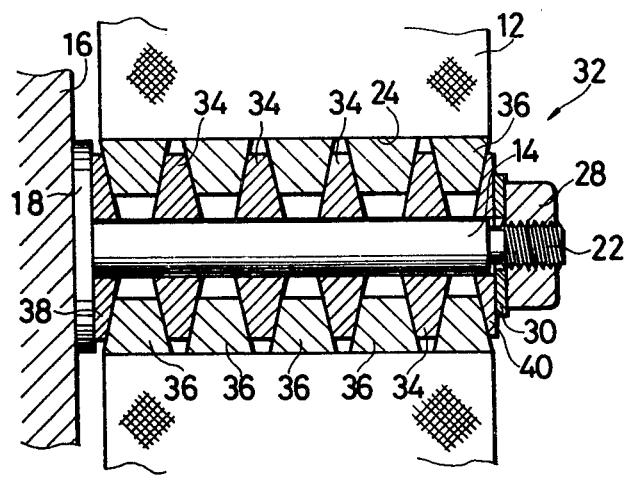
FIG. 2 is a sectional view showing a first preferred embodiment of an improved bearing structure according to the present invention.

In view of the above, the inventor has made some improvements to eliminate the above-mentioned several drawbacks as follows:

Referring to FIG. 2 of the drawings, there is illustrated an improved bearing structure 32 of a first preferred embodiment of the present invention. The same parts designated by numerals in FIG. 1 are designated by the same numerals in FIG. 2. The bearing structure 32 of this embodiment comprises a plurality of identical first ring members 34 which are spaced to each other. As shown, the first ring members 34 are coaxially mounted on the shaft 14. These first ring members 34 are made of materials, such as stainless steel, having high resistance to tensil stress and heat. Each of the first ring members 34 has a central hole (no numeral) the diameter of which is substantially equal to that of the shaft 14 and has an outer diameter which is slightly smaller than the diameter of the bore 24 of the heat regenerator 12. In addition, as shown in this drawing, each of the first ring members 34 is formed to have at each radial side a conical wall surface portion which is projected outwardly with respect to the center thereof.

Coaxially mounted on the periphery of the bore 24 of the heat regenerator 12 while alternately projecting in a meshing manner into spaces (no numerals) defined between the first ring members 34 is a plurality of second ring members 36 which are made of the before-mentioned $CaF_2$-$NiO$ sinter. Of course, instead of the $CaF_2$-$NiO$ sinter, other materials may be usable as long as they have sufficient resistances to wear and heat. Each of the second ring members 36 has a central hole (no numeral) the diameter of which is larger than that of the shaft 14 and has an outer diameter which is substantially equal to the diameter of the bore 24 of the heat regenerator 12. In addition, each of the second ring members 36 is formed conical at each radical side thereof contacting snugly the above-mentioned conical wall surface portion of the first ring member 34. As shown in this drawing, the first and second ring members 34 and 36 are arranged concentrically with respect to the longitudinal axis of the shaft 14.

Two third ring members 38 and 40 are coaxially mounted on the shaft 14 at positions respectively engageable with two of the second ring members 36 which two are arranged at the outermost positions in their group. The third ring members 38 and 40 are made of same material as the first ring members 34. Each of the third ring members 38 and 40 has a central hole (no numeral) the diameter of which is substantially equal to that of the shaft 14 and has an outer diameter which is slightly smaller than the diameter of the bore 24 of the heat regenerator 12. Preferably, the outer diameter of the third ring member 38 (40) is equal to that of the first ring member 34. In addition, each of the third ring members 38 and 40 is formed to have at its one radial side a flat portion (no numeral) contactable with the flange 18 of the shaft 14 and at its other radial side a conical wall surface portion (no numeral) projected outwardly with respect to the center thereof. The conical wall surface portions of the third ring members 38 and 40 are contiguously engageable with the corresponding conical surfaces of the two of the second ring members 36, as shown.

A nut 28 and a spring washer 30 which are made of some heat-resisting materials are removably fixed to the threaded stud portion 22 of the shaft 14 for tight connection between the shaft 14, the first ring members 34, the second ring members 36 and the third ring members 38 and 40. Thus, screwing the nut 28 will induce increased engaging forces between the first and second ring members 34 and 36 and between the first and second ring members 34 and 36 and the second and third ring members 36 and 38 (40). More specifically, the engaging forces between such ring members are increased in proportion to the force given by tightening of the nut 28.

According to the present invention, it is further required to set the nut 28 to generate a certain degree of internal stress in each of the second ring members 36 directed radially outwardly from the second ring member 36. More specifically, the setting of the nut 28 is made so that the degree of total internal stress thus generated in all second ring members 36 is generally equal to that of the impact shock applied to the second ring members 36 by the rotating heat regenerator 12 uniformly.

With the above-described construction, slidable rotation of the heat regenerator 12 on the outer surfaces of the second ring members 36 is achieved.

According to several experiments, it has been proved that the second ring members 36 which are made of such fragile material (CaF$_2$-NiO sinter) are not broken during the operation. It seems that impact shocks applied to the second ring members 36 are almost cancelled due to interference by the internal stress.

Referring to FIG. 3, there is shown a second preferred embodiment of bearing structure 42 of the present invention. The parts similar to those of the conventional bearing structure 10 are designated by the same reference numerals as in the case of FIG. 1. The bearing structure of this embodiment comprises very similar parts to those of the first preferred embodiment (FIG. 2) as shown. In this second embodiment, each of the first ring members 34' is formed to have at each radial side thereof a conical surface (no numeral) and each of the second ring members 36' is formed to have at its each radial side a conical wall surface portion (no numeral) engageable with the conical surface of the first ring member 34'. Furthermore, each of the third ring members 38' and 40' is formed to have at its one radial side a conical surface (no numeral) with which the conical wall surface portion of the corresponding one of the second ring members 36' is contiguously engaged. In this case also, the nut 28 must be fairly strongly set to generate a certain degree of internal stress in each of the second ring members 36'.

With this, the sliding rotation of the heat regenerator 12 on the radial surfaces of the second ring members 36' is achieved.

According to several experiments, it has been proved that the construction of the second embodiment has sufficient strength with respect to practical usage thereof in spite of employing fragile material such as CaF$_2$-NiO sinter.

FIGS. 4A and 4B illustrate the reason why the construction of the bearing structure of FIG. 3 has such increased strength. FIG. 4A shows a partial sectional view of the second ring member 36' which view is taken along a plane parallel to the axis of the shaft 14. On the contrary FIG. 4B is a partial sectional view of the member 36' which is taken along a plane normal to the axis of the shaft 14. The reason for increased strength is as follows:

When the compressing force generated by the nut 28 is sufficiently strong, not only compression force $P_1$ directed in axial direction but also compression force $P_2$ directed toward the center of the second ring member 36' is applied to the ring member 36', as shown in FIG. 4A. Apart from this, if a force $F_o$ by an impact shock caused by the rotating heat regenerator 12 is applied to a portion of the outer peripheral surface of the second ring member 36', not only extension force $F_1$ directed in axial direction opposite to that of $P_1$ but also extension force $F_2$ directed laterally outwardly from the second ring member 36' will be induced. It should be noted that the direction of the force $P_1$ is opposite to that of $F_1$ as shown in FIG. 4A, furthermore, the direction of the force $P_2$ is opposite to that of $F_2$ as shown in FIG. 4B. From the above, it will be readily understood that if the nut 28 is set to generate the forces $P_1$ and $P_2$ which are considerably greater than the respective forces $F_1$ and $F_2$, the second ring member 36' can maintain its stable condition during the operation. As a result, the construction of this second embodiment has sufficient strength with respect to practical usage thereof in spite of employing fragile material such as CaF$_2$-NiO sinter.

According to the present invention, the following several effects are expected.

(1) Since the wear-resisting material such as CaF$_2$-NiO sinter is arranged at positions slidably engageable with the peripheral surface of the central bore of the heat regenerator, smooth and reliable rotation of the heat regenerator is permanently achieved.

(2) Since the support of the heat regenerator is made by the spacedly arranged second ring members, the frictional sliding resistance between the heat regenerator and the second ring members is considerably low providing smooth and stable rotation of the heat regenerator.

(3) Since the second ring members are arranged to absorb therein the compression stress, the second ring members will not be broken even when some impact shock is applied to the ring members by the heat regenerator.

(4) The concentric arrangements between the first, second and third ring members and the shaft can be accurately and tightly made at their assembling operations. This will increase the life time of the bearing structure.

(5) Since the second ring members are not engaged with the shaft, heat expansion of the shaft does not affect the second ring members. Furthermore, the heat expansion of the first and third ring members brings about increased engaging forces to the arrangement of the bearing structure.

Although in the previous description, the nut 28 and the spring washer 30 are employed for the connection of the bearing structure with the shaft 14, it is also possible to use a fastening arrangement comprising a tension bolt having a threaded bore and a head, and a stationary threaded bolt, the tension bolt being screwed on the stationary threaded bolt to mount the bearing structure to the shaft. Thus, in using this fastening arrangement, the engaging forces to the first, second and third ring members are controlled by rotating the tension bolt relative to the threaded bolt. This arrangement is advantageous in providing the bearing structure with high engaging force.

What is claimed is:

1. A bearing structure for rotatably supporting a rotary disc on a stationary shaft, said rotary disc having a central bore through which said stationary shaft is inserted, said bearing structure comprising:

a plurality of spaced first ring members coaxially mounted on said stationary shaft, each of said first ring members having at its each radial side first means defining a first conical surface concentric with said stationary shaft;

a plurality of spaced second ring members coaxially mounted on the surface of said central bore of said disc and meshing with said first ring members, each of said second ring members having at its each radial side second means defining a second conical surface concentric with said stationary shaft;

said first conical surface and said second conical surface being contiguously engaged with each other at their substantially entire portions; and holding means for providing a tight contact between said first and second ring members and said stationary shaft, said holding means including two third ring members coaxially mounted on said stationary shaft at positions respectively engageable with two of said second ring members which two are respectively arranged at the axially outermost end positions of said plurality of spaced second ring members, each of said third ring members having at its one radial side third means defining a third conical surface concentric with said stationary shaft, said third conical surface and the second conical surface which is formed on the axially outer side of the corresponding one of said two second ring members being contiguously engaged with each other at their substantially entire portions; and urging means for urging said third ring members into tight contact with said two second ring members and thus providing a tight connection between said first, second and third ring members and said stationary shaft.

2. A bearing structure as claimed in claim 1, in which said urging means comprises a nut operative with a threaded stud portion formed at the leading end of said stationary shaft and a spring washer disposed about said threaded stud portion between said nut and the corresponding one of said third ring members.

3. A bearing structure as claimed in claim 1, in which the outer diameter of each of said first ring members is smaller than the diameter of said central bore of said rotary disc, furthermore in which the inner diameter of each of said second ring members is larger than the diameter of said stationary shaft.

4. A bearing structure as claimed in claim 3, in which the outer diameter of each of said third ring members is equal to that of each of said first ring members.

5. A bearing structure as claimed in claim 3, in which said first conical surface is formed on an outer peripheral portion which is radially outwardly projected from the first ring member, furthermore in which said second conical surface contacts a conical surface formed on a radial side of said second ring member.

6. A bearing structure as claimed in claim 5, in which said third conical surface is formed on a portion of said third ring member which is radially outwardly projected.

7. A bearing structure as claimed in claim 3, in which said first conical surface contacts a conical surface formed on a radical side of said first ring member, furthermore in which said second conical surface is formed on an outer portion which is radially outwardly projected from said second ring member.

8. A bearing structure as claimed in claim 7, in which said third conical surface contacts a conical surface formed on a radial side of said third ring member.

9. A bearing structure as claimed in claim 1, in which said second ring members are made of wear-resisting material and said first and third ring members are made of tensile stress-resisting material.

10. A bearing structure as claimed in claim 9, in which said second ring members are made of a sinter comprising $CaF_2$ and $NiO$.

11. A bearing structure as claimed in claim 9, in which said first and third ring members are made of stainless steel.

* * * * *